United States Patent
Tesavis et al.

(10) Patent No.: US 7,064,870 B2
(45) Date of Patent: Jun. 20, 2006

(54) SYSTEM FOR ACCOMMODATING THIRD PARTY IMAGING PROCESSING SOLUTIONS IN A SCANNER

(75) Inventors: Carl J. Tesavis, Spencerport, NY (US); Christopher D. Larson, Webster, NY (US); Arthur N. Nielsen, Pittsford, NY (US); James R. Pamper, Lima, NY (US)

(73) Assignee: Eastman Kodak Company, Rochester, NY (US)

( * ) Notice: Subject to any disclaimer, the term of this patent is extended or adjusted under 35 U.S.C. 154(b) by 866 days.

(21) Appl. No.: 09/976,124

(22) Filed: Oct. 11, 2001

(65) Prior Publication Data
US 2003/0072026 A1    Apr. 17, 2003

(51) Int. Cl.
*H04N 1/04*    (2006.01)
*G03G 15/00*    (2006.01)

(52) U.S. Cl. ............ 358/448; 358/475; 358/496; 358/497; 358/474; 399/110

(58) Field of Classification Search .......... 358/475, 358/474, 496, 497, 448; 399/110
See application file for complete search history.

(56) References Cited

U.S. PATENT DOCUMENTS 4,719,516 A * 1/1988 Nagashima ............ 358/448
5,739,850 A   4/1998 Hori
5,861,873 A   1/1999 Kikinis
5,881,333 A   3/1999 Takahashi et al.
6,112,857 A   9/2000 Morrison
6,199,120 B1  3/2001 Tanaka ............ 710/16
6,278,609 B1  8/2001 Suzuki et al. ............ 361/704
6,366,747 B1* 4/2002 Roller ............ 399/110

FOREIGN PATENT DOCUMENTS

EP    0 835 013 A2    3/1998
JP    2001-057613     2/2001

* cited by examiner

*Primary Examiner*—Edward L. Coles, Sr.
*Assistant Examiner*—Houshang Safaipour
(74) *Attorney, Agent, or Firm*—Peyton C. Watkins

(57) ABSTRACT

A system for permitting insertion or replacement of electronic cards, the system includes a scanner for scanning hardcopy elements, the scanner including an electronic component for performing at least one processing function on an electronic representation of the hardcopy element; a first processor for directing operations of the scanner and for receiving directions that are passed to other components; a field-installed electronic card that performs additional processing on the electronic representation of the hardcopy element; a second processor electrically connected to the scanner for sending directions to the scanner processor which processor includes field-installed control code for directing the field-installed electronic card.

12 Claims, 1 Drawing Sheet

SYSTEM FOR ACCOMMODATING THIRD PARTY IMAGING PROCESSING SOLUTIONS IN A SCANNER

FIELD OF THE INVENTION

The invention relates to digital scanners and, more particularly, to such scanners having a field-installable electronic card for permitting field installation of the electronic card so that additional, or even later-developed, image processing functionality is available to the scanner.

BACKGROUND OF THE INVENTION

On digital scanners having one or more scan modules able to produce a digital representation of an image at rates capable of minimally supporting ten 8.5×11 pages per minute, there is a requirement for the hardware to process and transport the high volume of resultant data. In the normal base configuration, there is a foreseeable set of functions that the manufacturer must minimally provide. This may include pixel correction, gain adjustments, and color correction for example. This functionality will be referred to hereinafter as the Scanner Front End (SFE). The out put of this SFE image chain is then fed into an image buffer. The data representing the images in the image buffer are then communicated to an external host processor over a digital interface.

It is often desirable to do additional, high-end image processing such as image binarization and color drop out in a personality (daughter) card which can optionally be installed in the image chain between the output of the SFE and the image buffer. These daughter cards may be developed by third party manufacturers who want to provide custom, high-end image processing capability for the base scanner.

The shortcoming with this method of delivering high-end imaging capabilities for a digital scanner is that it requires close technical coupling of the development of the scanners embedded firmware and the unknown $3^{rd}$ party daughter card development. This would be the case if the scanner firmware required knowledge of the potential daughter card functionality to control it. The other potential shortcoming is that the base scanner's implementation artificially constrains the functionality of the daughter card by providing a limited interface.

SUMMARY OF THE INVENTION

The present invention is directed to overcoming one or more of the problems set forth above. Briefly summarized, according to one aspect of the present invention, the invention resides in a system for permitting insertion or replacement of electronic cards, the system comprises (a) a scanner for scanning hardcopy elements, the scanner comprising: (a1) an electronic component for performing at least one processing function on an electronic representation of the hardcopy element; (a2) a first processor for directing operations of the scanner and for receiving directions that are passed to other components; (a3) a field-installed electronic card that performs additional processing on the electronic representation of the hardcopy element; (b) a second processor electrically connected to the scanner for sending directions to the scanner processor which processor includes field-installed control code for directing the field-installed electronic card.

Advantageous Effect of the Invention

The present invention has the advantages of enabling delivery of high-end imaging functions by parties other than the scanners original developer. It also permits third party developers to extend the base scanner functionality to produce products unforeseen by the base scanners developer for enhancing marketability of base scanner. The present invention further permits the base scanner developer to spend a minimum amount of time on high-end imaging solutions and concentrate on the base product permitting early delivery to the market. Still further, the present invention permits the daughter card and base scanner development to occur at different times, and enables a flexible scanning/imaging architecture which extends the useful life of the base scanner.

DETAILED DESCRIPTION OF THE INVENTION

Figure 1:
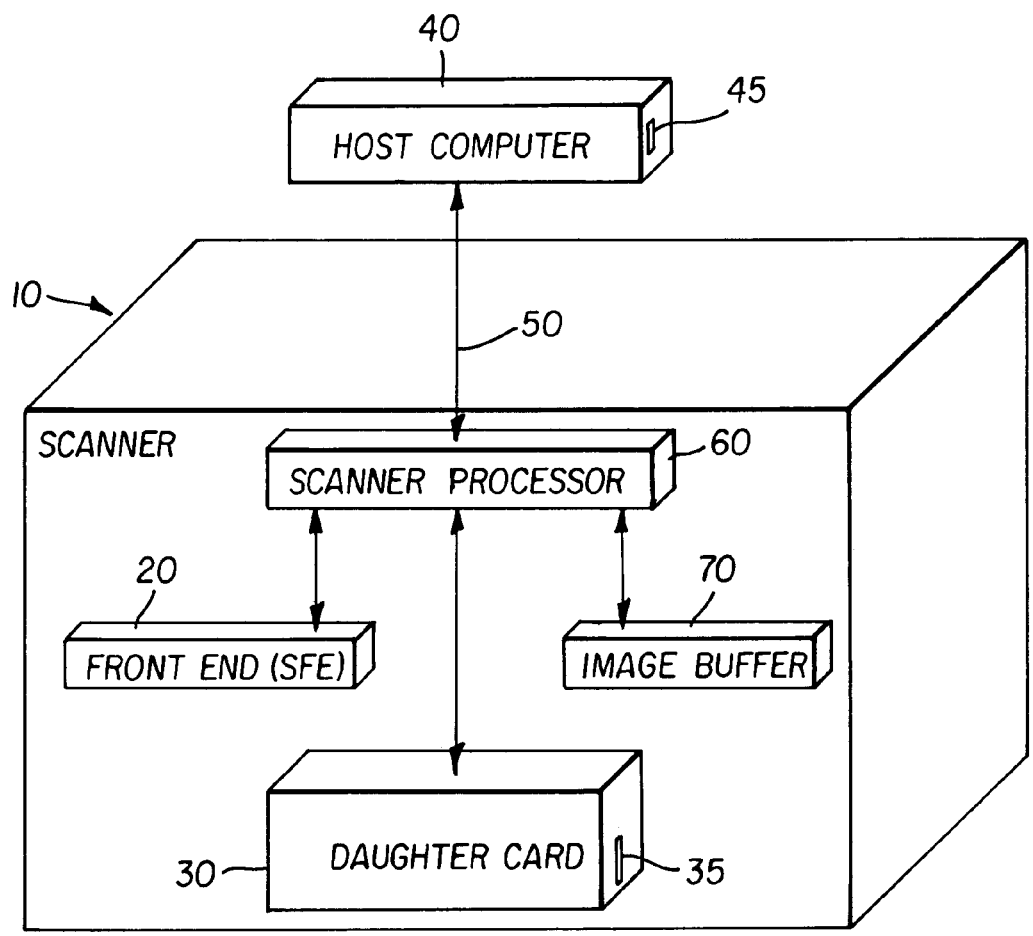
FIG. 1 is a drawing of a scanner of the present invention.

In the following description, the present invention will be described in the preferred embodiment as a software program. Those skilled in the art will readily recognize that the equivalent of such software may also be constructed in hardware.

Referring to FIG. 1, there is shown the scanner 10 of the present invention. The scanner 10 includes conventional components (not shown) for converting a document into a digital representation of the document, all of which are well known in the art and will not be described in detail herein. The scanner 10 includes a scanner front end (SFE) 20 having manufactory installed processing, such as re-phasing, line reversal, defect concealment and color correction, which receives the digital representation of the document from the conventional components. A field-installed daughter card 30 having additional processing, such as color dropout, deskew, binarization and the like as well as future currently unknown functions, receives the digital image data stream from the SFE 20 and performs this additional processing thereon. The daughter card 30 also includes a processor 35 for directing the additional processing and supporting command and control communications with the scanner. A host computer 40 having a processor 45 includes field-installed software for communicating control instructions and protocols via an interface 50 to the daughter card. It is instructive to note that the host computer 40 may be a separate external component from the scanner 10.

The scanner 10 also includes a processor 60 which functions as a pass-through for these control instructions that are passed to the daughter card 30 from the host computer 40. The processor 60 also functions to direct operations for all factory-installed processing, such as that performed by the SFE 20.

Field-installed as defined herein means a component installed after the customer has possession and/or ownership of the designated equipment into which the component will be installed. Typically, the designated equipment will be located at the third party's location or their designation.

A buffer 70 receives the processed digital file from the daughter card 30 for storage until directed by the host computer 40 to output to the host computer 40 for storage, viewing and additional processing, all of which output components are well known in the art and will not be discussed in detail herein.

The invention has been described with reference to a preferred embodiment. However, it will be appreciated that variations and modifications can be effected by a person of ordinary skill in the art without departing from the scope of the invention.

PARTS LIST 10 scanner
20 SFE
30 daughter card
35 processor of daughter card
40 host computer
45 processor of computer
50 interface
60 scanner processor
70 buffer

What is claimed is:

1. A system for permitting insertion or replacement of electronic cards, the system comprising:
   (a) a scanner for scanning hardcopy elements, the scanner comprising:
      (a1) an electronic component for performing at least one processing function on an electronic representation of the hardcopy element;
      (a2) a first processor for directing operations of the scanner and for receiving directions that are passed to other components;
      (a3) a field-installed electronic card that performs additional processing on the electronic representation of the hardcopy element; and
   (b) a second processor electrically connected to the scanner for sending directions to the field-installed electronic card through the first processor, where the directions include control instructions and protocols that are provided by the second processor from field-installed control code for directing the field-installed electronic card.

2. The system as in claim 1, wherein the scanner includes an electronic board into which the field-installed electronic card is inserted.

3. The system as in claim 1 further comprising a computer into which the second processor resides.

4. The system as in claim 1, wherein the field-installed electronic card includes a third processor.

5. A method for permitting insertion or replacement of electronic cards, the method comprising the steps of:
   (a) obtaining access to a scanner which scans hardcopy elements and which includes an electronic component for performing at least one processing function on an electronic representation of the hardcopy element, and a first processor for directing operations of the scanner and for receiving directions that are passed to other components;
   (b) installing a field-installed electronic card that performs additional processing on the electronic representation of the hardcopy element;
   (c) obtaining access to a second processor electrically connected to the scanner for sending directions to the field-installed electronic card through the first processor; and
   (d) installing field-installed control code into the second processor for directing the field-installed electronic card, where the directions include control instructions and protocols that are provided by the second processor from the field-installed control code.

6. The method as in claim 5 further comprising the step of installing the field-installed electronic card into an electronic board.

7. The method as in claim 5 further comprising the step of providing a computer into which the second processor resides.

8. The method as in claim 5 further comprising the step of providing a third processor on the field-installed electronic card.

9. The system as in claim 1, wherein the second processor is external to the scanner.

10. The system as in claim 1, wherein the second processor is internal to the second processor.

11. The method as in claim 5 further comprising the step of providing the second processor external to the scanner.

12. The method as in claim 5 further comprising the step of providing the second processor internal to the scanner.

* * * * *